US009458919B2

(12) United States Patent
Yanase

(10) Patent No.: US 9,458,919 B2
(45) Date of Patent: Oct. 4, 2016

(54) METHOD OF MANUFACTURING DIFFERENTIAL DEVICE

(71) Applicant: MUSASHI SEIMITSU INDUSTRY CO., LTD., Toyohashi-Shi, Aichi (JP)

(72) Inventor: Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 162 days.

(21) Appl. No.: 14/578,894

(22) Filed: Dec. 22, 2014

(65) Prior Publication Data

US 2015/0184734 A1 Jul. 2, 2015

(30) Foreign Application Priority Data

Dec. 27, 2013 (JP) .................... 2013-271809

(51) Int. Cl.
*F16H 48/38* (2012.01)
*F16H 48/40* (2012.01)

(52) U.S. Cl.
CPC ............ *F16H 48/38* (2013.01); *F16H 48/40* (2013.01); *F16H 2048/382* (2013.01); *F16H 2048/385* (2013.01); *Y10T 29/49464* (2015.01)

(58) Field of Classification Search
CPC ...................................... F16H 48/36
See application file for complete search history.

(56) References Cited

U.S. PATENT DOCUMENTS 4,125,026 A * 11/1978 Torii ............... F16H 48/08
29/893.1
6,656,079 B2 * 12/2003 Eulenstein ............ F16H 48/08
475/230
8,015,899 B2 * 9/2011 Gianone ............... B23K 26/28
74/606 R
8,814,742 B2 * 8/2014 Uchida ............... B23K 26/28
403/270
8,876,649 B2 11/2014 Uchida et al.
2013/0195545 A1 * 8/2013 Tsuchida ............ F16H 48/40
403/270
2015/0099602 A1 * 4/2015 Berndt .................. F16H 48/08
475/230

FOREIGN PATENT DOCUMENTS

| JP | 2003-001490 A | 1/2003 |
|---|---|---|
| JP | 2007-010040 A | 1/2007 |
| JP | 2011-000624 A | 1/2011 |
| JP | 2011-167746 A | 9/2011 |
| JP | 5327130 B2 | 10/2013 |
| JP | 5332937 B2 | 11/2013 |
| JP | 5359813 B2 | 12/2013 |
| WO | 2013/018223 A1 | 2/2013 |

* cited by examiner

*Primary Examiner* — Jacob Cigna

(74) *Attorney, Agent, or Firm* — Carrier Blackman & Associates, P.C.; William D. Blackman; Joseph P. Carrier

(57) ABSTRACT

In a method of manufacturing a differential device, a hub of a ring gear is press-fitted to a flange from a first bearing boss side, then a press-fit portion between the flange and the ring gear is equally divided into a plurality of divided regions arranged along a peripheral direction, and simultaneously the divided regions are welded. Accordingly, the press-fit portion between the flange and the ring gear can be efficiently welded while welding distortion of the ring gear is eliminated or reduced even in a case where work windows of a differential case cut into a side surface of the flange on the first bearing boss side to form recessed portions.

3 Claims, 4 Drawing Sheets

METHOD OF MANUFACTURING DIFFERENTIAL DEVICE

BACKGROUND OF THE INVENTION

1. Field of the Invention

The present invention relates to a differential device, especially a method of manufacturing the same, which comprises a differential mechanism and a differential case housing the differential mechanism, the differential case including: first and second bearing bosses formed integrally therewith on one side portion and other side portion of the differential case and aligned on a same axis; an annular flange formed integrally therewith on an intermediate portion which is offset from a center of the differential case toward the second bearing boss side; work windows for inserting the differential mechanism, the work windows being provided in portions of a peripheral wall of the differential case which face each other on a diametral line orthogonal to the axis; a ring gear press-fitted to an outer peripheral surface of the flange; and a press-fit portion between the flange and the ring gear being welded on the second bearing boss side.

2. Description of the Related Art

Such a differential device is known as disclosed in International Publication No. WO2013-18223.

In a differential device disclosed in International Publication No. WO2013-18223, wall thickness of a flange of a differential case is uniform over an entire periphery, and welding of a press-fit portion between the flange and a ring gear is performed on right and left opposite side portions. Such a structure is effective in reducing welding distortion of the ring gear, but increases the number of welding steps to make manufacturing cost reduction difficult. Moreover, in a case where work windows are formed to be large in order to facilitate inner surface machining of the differential case and insertion of a differential mechanism into the differential case, the work windows may cut into a side surface of the flange on a first bearing boss side to form recessed portions. Such recessed portions interfere with all-around welding of the flange with the ring gear on the opposite side portions, and causes the welding distortion of the ring gear.

SUMMARY OF THE INVENTION

The present invention has been accomplished in view of the above-described circumstances, and an object of the present invention is to provide a method of manufacturing a differential device in which a press-fit portion between a flange and a ring gear can be efficiently welded while welding distortion of the ring gear is eliminated or reduced even in a case where work windows cut into a side surface of the flange on a first bearing boss side to form recessed portions.

In order to achieve the object, according to a first aspect of the present invention, there is provided a method of manufacturing a differential device, the differential device comprising a differential mechanism and a differential case housing the differential mechanism, the differential case including: first and second bearing bosses formed integrally therewith on one side portion and other side portion of the differential case and aligned on a same axis; an annular flange formed integrally therewith on an intermediate portion which is offset from a center of the differential case toward the second bearing boss side; work windows for inserting the differential mechanism, the work windows being provided in portions of a peripheral wall of the differential case which face each other on a diametral line orthogonal to the axis, the work windows cutting into the flange to form recessed portions in a side surface of the flange on the first bearing boss side, the flange having a ring gear press-fitted to an outer peripheral surface thereof; and a press-fit portion between the flange and the ring gear being welded, wherein the method comprises steps of: press-fitting a hub of the ring gear to the flange from the first bearing boss side; and equally dividing the press-fit portion between the flange and the ring gear into a plurality of divided regions arranged along a peripheral direction, and simultaneously welding the divided regions.

According to the first aspect of the present invention, the hub of the ring gear is press-fitted to the flange from the first bearing boss side, then the press-fit portion between the flange and the ring gear is equally divided into the plurality of divided regions arranged along the peripheral direction, and these divided regions are simultaneously welded. Accordingly, in spite of the fact that the welding of the press-fit portion between the flange and the hub is performed only on one side-surface side of the flange and the hub, bond strength of the press-fit portion between the flange and the hub can be improved, and manufacturing cost can be reduced by improving efficiency of welding operation. Also, thermal strain of the flange and the ring gear caused by welding can be eliminated or significantly reduced. Moreover, since the one side-surface side of the flange and the hub to be welded is opposite to the work windows, spatters produced during the welding do not enter the differential case through the work windows.

According to a second aspect of the present invention, in addition to the first aspect, a stopper wall protruded from an inner peripheral surface of the hub is brought into contact with the flange to regulate a press fit depth of the hub to the flange within a specified range.

According to the second aspect of the present invention, the press fit depth of the hub to the flange can be regulated within the specified range by a very simple technique in which the stopper wall protruded from the inner peripheral surface of the hub of the ring gear is brought into contact with the flange.

According to a third aspect of the present invention, in addition to the second aspect, the recessed portions are left between the flange and the stopper wall, and gas produced during the welding is discharged through the recessed portions.

According to the third aspect of the present invention, the gas produced during the welding can be discharged to the outside by utilizing the recessed portions of the flange, and the welding can be favorably performed.

The above and other objects, characteristics and advantages of the present invention will be clear from detailed descriptions of the preferred embodiment which will be provided below while referring to the attached drawings.

DESCRIPTION OF THE PREFERRED EMBODIMENT

Hereinafter, an embodiment of the present invention will be described based on the accompanying drawings.

Figure 1:
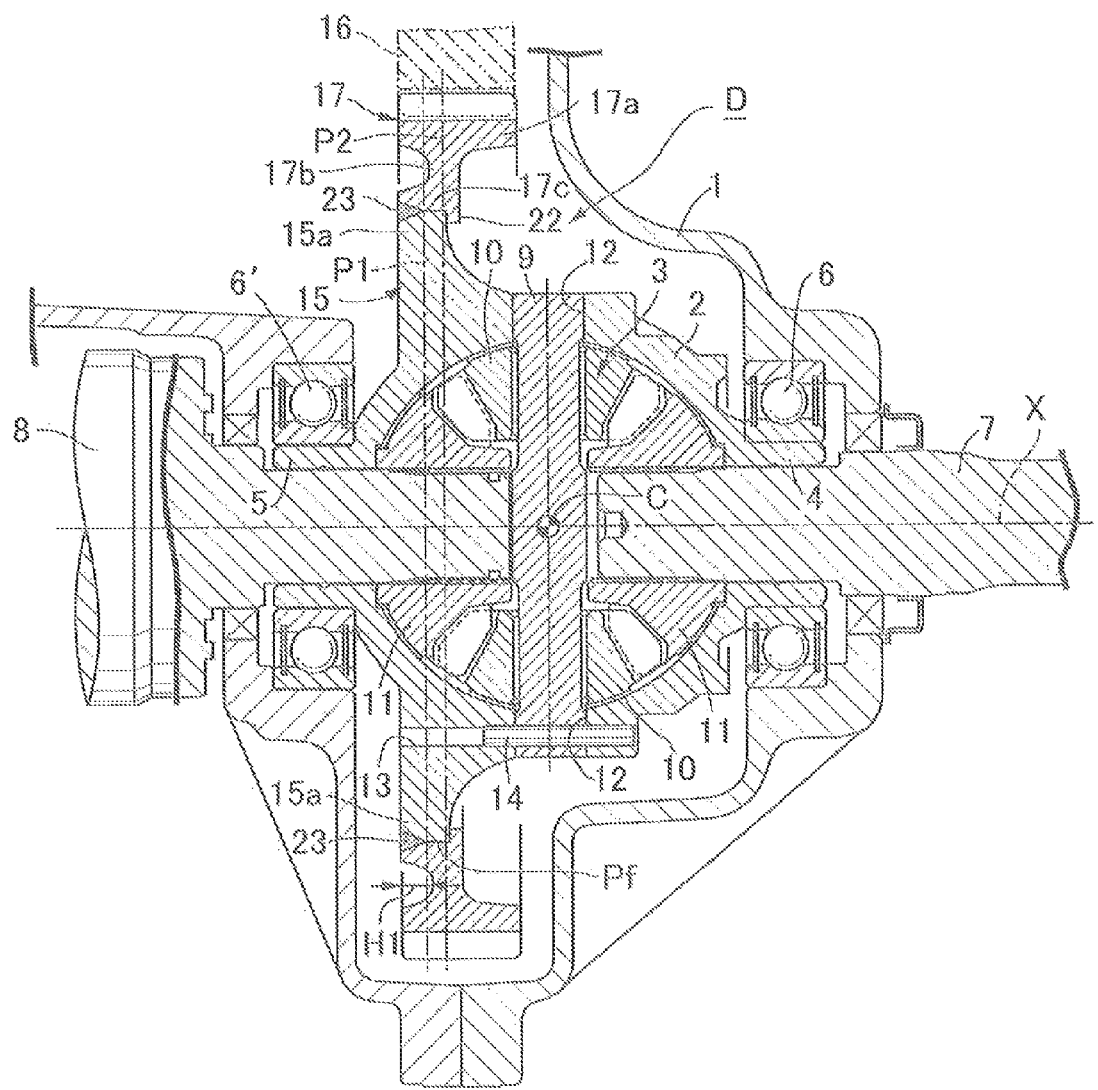
FIG. 1 is a longitudinal sectional plan view partially showing a differential device of the present invention and a transmission case for housing the same.

In FIG. 1, a differential device D is housed in a transmission case 1 of a vehicle. This differential device D includes a differential case 2 and a differential mechanism 3 housed in this differential case 2. On a right side portion and a left side portion of the differential case 2, a first bearing boss 4 and a second bearing boss 5 aligned on the same axis X are formed integrally therewith. These first and second bearing bosses 4, 5 are supported by the transmission case 1 via bearings 6 and 6', and support right and left axles 7, 8.

The differential mechanism 3 includes a pinion shaft 9 held by the differential case 2 to be orthogonal to the axis X, a pair of pinion gears 10 supported by the pinion shaft 9, and a pair of side gears 11 spline-connected to inner ends of the axles 7, 8 to mesh with the pinion gears 10. A back face of each gear is rotatably supported by a spherical inner surface of the differential case 2.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves the prevention of the falling off of the pinion shaft 9 from the supporting hole 12.

Moreover, the differential case 2 has an annular flange 15 formed integrally therewith on an intermediate portion which is offset from a center C of the differential case 2 toward the second bearing boss 5 side. A ring gear 17 to mesh with an output gear 16 of a transmission is attached to the flange 15.

Figure 2:
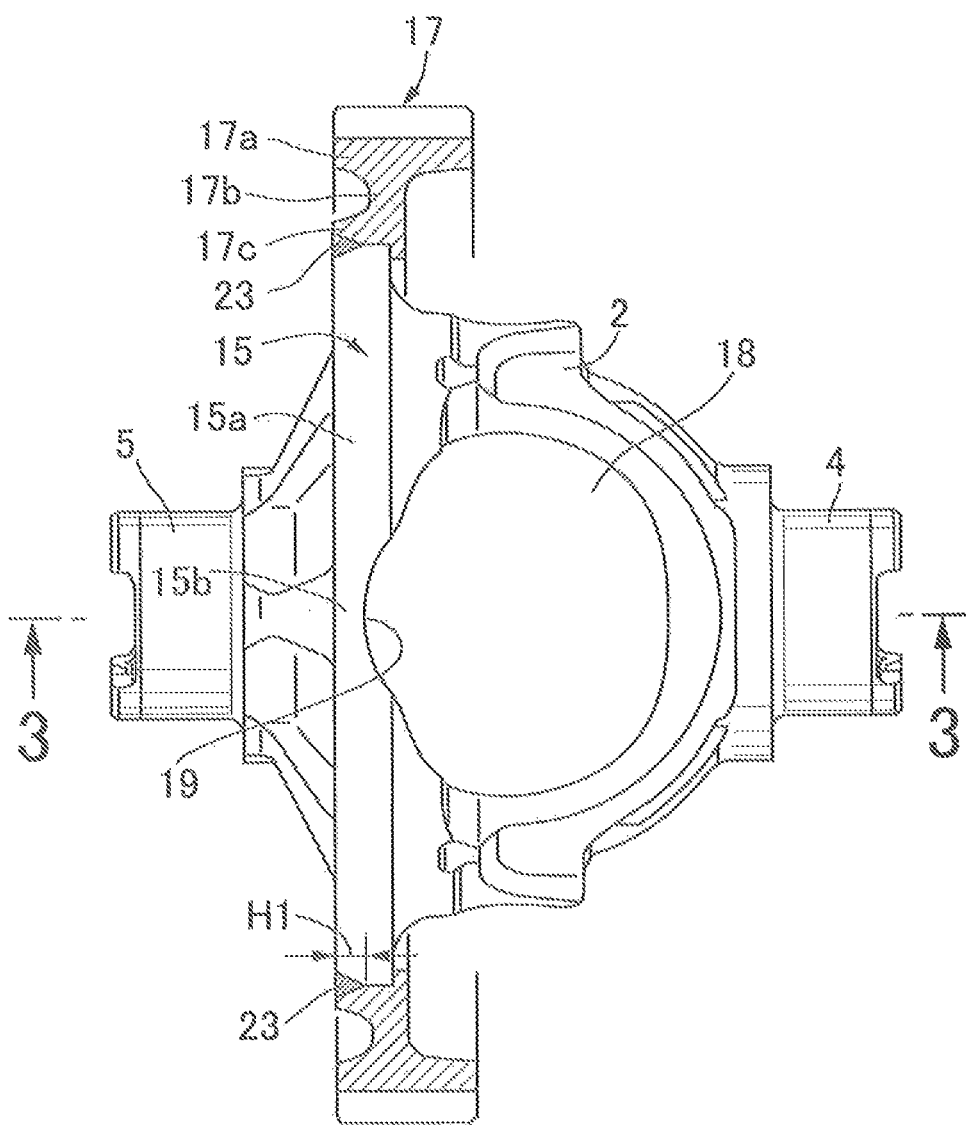
FIG. 2 is a plan view of a differential case of the above-described differential device.
Figure 3:
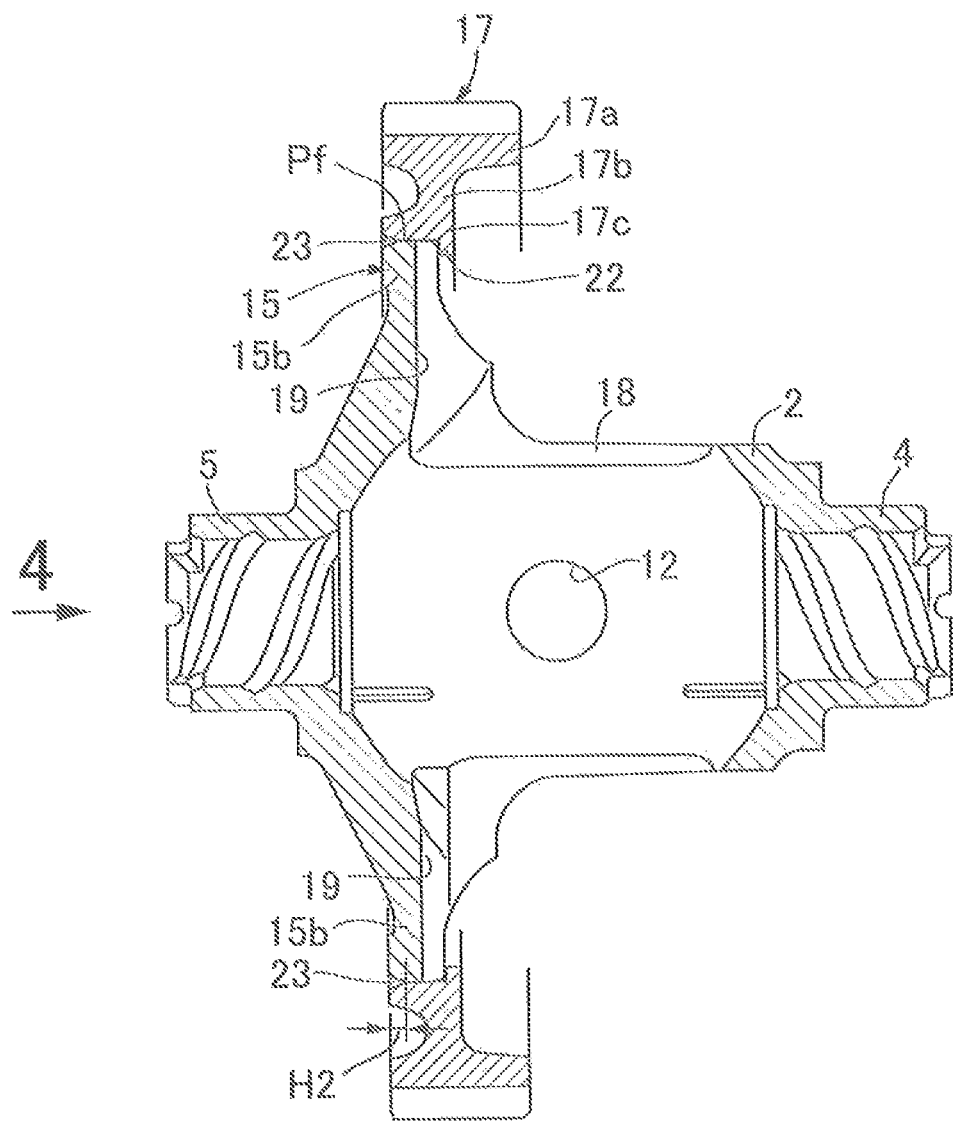
FIG. 3 is a sectional view taken along line 3-3 in FIG. 2.
Figure 4:
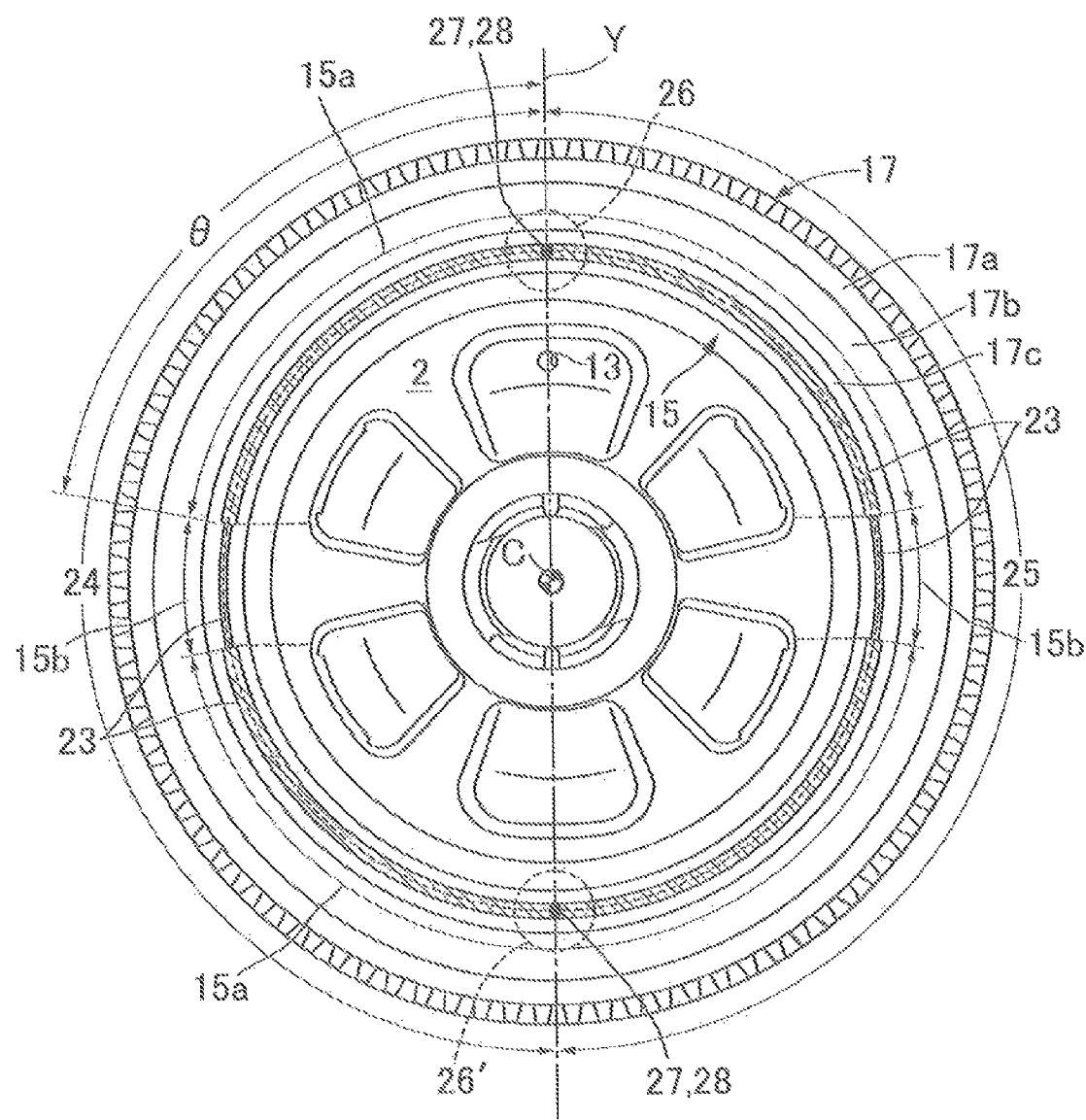
FIG. 4 is a view from arrow 4 in FIG. 3 and shows how to weld a flange and a ring gear.

As shown in FIGS. 2 to 4, further, in portions of a peripheral wall of the differential case 2 which face each other on a diametral line orthogonal to the axis X, a pair of work windows 18 for machining the spherical inner surface of the differential case 2 and for facilitating insertion of the differential mechanism 3 into the differential case 2 are provided. These work windows 18 are formed to be large so as to cut into the flange 15. Thus, recessed portions 19 are formed in a side surface of the flange 15 on the first bearing boss 4 side. Accordingly, the flange 15 has a pair of thin-walled portions 15b in which the recessed portions 19 exist and a pair of thick-walled portions 15a in which the recessed portions 19 do not exist.

As shown in FIGS. 1 and 3, the ring gear 17 includes a rim 17a having a helical tooth group on an outer periphery thereof, a plate-shaped spoke 17b protruding from an inner peripheral surface of the rim 17a, and an annular hub 17c protruding from a side surface of an end portion of an inner periphery of the spoke 17b on the second bearing boss 5 side. An annular stopper wall 22 protruding on an inner peripheral surface side of the hub 17c is formed integrally with the spoke 17b. The hub 17c is press-fitted to the flange 15 from the first bearing boss 4 side. At this time, the stopper wall 22 comes into contact with a side surface of the flange 15 to regulate a press fit depth thereof.

In the above-described ring gear 17, a rotational center plane P2 of the spoke 17b is disposed closer to the first bearing boss 4 than a rotational center plane P1 of the flange 15. Thus, the ring gear 17 is placed as close as possible to the center C of the differential case 2, and torque transmission from the ring gear 17 to the differential case 2 can be made favorable. Moreover, thrust loads and a radial load acting on the ring gear 17 can be shared in good balance by a bearing 6 which allows the first bearing boss 4 to be supported by the transmission case 1 and a bearing 6' which allows the second bearing boss 5 to be supported by the transmission case 1.

Moreover, in the transmission case 1, there are cases where a position in a right-left direction of the output gear 16 which is to mesh with the ring gear 17 is changed in accordance with the specification of the transmission. According to the present embodiment, since the rotational center plane P of the spoke 17b is disposed as close as possible to the center C of the differential case 2, a change in the position of the output gear 16 to the left or right direction can be handled by elongating only the rim 17a to the left or right direction in accordance with the output gear 16 without changing a position of the spoke 17b. Thus, a flexible response can be made to a change in the specification of the output gear 16.

In FIG. 4, a press-fit portion Pf between the flange 15 and the hub 17c are subjected to laser welding 23 from the second bearing boss 5 side, over an entire periphery of the press-fit portion Pf.

In the welding, the pin hole 13 is provided in a central portion of the thick-walled portion 15a in advance, and the press-fit portion Pf between the flange 15 and the hub 17c is equally divided into first and second divided regions 24, 25 by a diametral line Y of the flange 15 which passes through a center of the pin hole 13. Then, a pair of laser torches 26, 26' are set to be pointed at two dividing points between the first and second divided regions 24, 25, respectively. While the laser torches 26, 26' or the differential case 2 is rotated in a fixed direction about a central axis of the flange 15, the welding 23 is performed by irradiating the first and second divided regions 24, 25 with laser beam. In this way, welding start points 27 and welding end points 28 of the first and second divided regions 24, 25 adjacent to each other are respectively matched in the central portions of the respective thick-walled portions 15a.

Moreover, at this time, when the welding 23 is performed on the thin-walled portions 15b, weld depths H2 (see FIG. 3) of the thin-walled portions 15b are made shallower than weld depths H1 (see FIG. 1) of the thick-walled portions 15a by reducing laser output lower than that in the welding of the thick-walled portions 15a or increasing welding speed higher than that in the welding of the thick-walled portions 15a. Alternatively, the thin-walled portions 15b are not welded.

Next, the operation of this embodiment will be described.

In the ring gear 17, the annular stopper wall 22 protruding on the inner peripheral surface side of the hub 17c is formed integrally with the rim 17a. When the hub 17c is press-fitted to the flange 15 of the differential case 2 from the first bearing boss 4 side, the stopper wall 22 comes into contact with the side surface of the flange 15 to regulate the press fit depth. The press-fit portion Pf between the flange 15 and the hub 17c of the ring gear 17 is subjected to the laser welding 23 from the second bearing boss 5 side. Accordingly, in spite of the fact that the welding of the press-fit portion Pf between the flange 15 and the hub 17c is performed only on one side-surface side of the flange 15 and the hub 17c, bond strength between the flange 15 and the hub 17c can be improved, and manufacturing cost can be reduced by improving efficiency of welding operation. Further, since the one side-surface side of the flange 15 and the hub 17c to be welded is opposite to the work windows 18, there is no concern that spatters produced during the welding enter the differential case 2 through the work windows 18.

Moreover, when the welding 23 is performed on the above-described press-fit portion Pf, the thick-walled portions 15a of the flange 15 and the ring gear 17 are welded to the predetermined weld depth H1, and the thin-walled portions 15b of the flange 15 and the ring gear 17 are welded to the weld depth H2 shallower than the predetermined weld depth H1 or not welded at all. Accordingly, piercing welding in the thin-walled portions 15b can be avoided, and spatters can be prevented from entering the differential case 2.

Moreover, the welding start points 27 and the welding end points 28 of the press-fit portion Pf between the flange 15 and the ring gear 17 are matched in the thick-walled portions 15a, respectively. Accordingly, the matching of the welding start points 27 and the welding end points 28 enables piercing welding to be avoided even when weld depths become deep at the matched points.

Further, the press-fit portion Pf between the flange 15 and the ring gear 17 is equally divided into the plurality of divided regions 24, 25 arranged along a peripheral direction, and the plurality of divided regions 24, 25 are simultaneously subjected to the welding 23. Accordingly, cooling speed differences among welded portions are reduced as small as possible, and unevenness of thermal strain of the ring gear 17 caused by welding can be eliminated or significantly reduced. This can prevent inclination of the ring gear 17. Also, the welding start point 27 and the welding end point 28 adjacent thereto, of each of the divided regions 24, 25 are matched in the thick-walled portion 15a. Accordingly, influence of strength reduction in the flange 15 and the ring gear 17 caused by a plurality of twice-welded portions can be suppressed, and piercing welding can be avoided at each matched point.

Moreover, the pin hole 13 into which the falling-off prevention pin 14 for the pinion shaft 9 of the differential mechanism 3 is fitted is provided to pass through an outer peripheral portion of the differential case 2 which corresponds to the thick-walled portion 15a, and the welding start points 27 are set with reference to the pin hole 13. Accordingly, the welding end points 28 as well as the welding start points 27 are naturally set in the thick-walled portions 15a, respectively. Thus, welding can be properly performed without providing a special mark for setting the welding start points 27.

Moreover, the recessed portions 19 are left between the flange 15 and the stopper wall 22. The recessed portions 19 contribute to facilitating discharge of gas produced during the welding of the press-fit portion Pf to the outside.

It should be noted that the intervals θ from the welding start point 27 and the welding end point 28 matched with each other to the thin-walled portions 15b are desirably set to 45° or more about the central axis of the flange 15. Specifically, in a case where laser output for the thin-walled portions 15b is reduced lower than that for the thick-walled portions 15a, the laser output can be reduced in a state in which the output is even more stable than immediately after the start of the laser output by providing a sufficient interval θ from the welding start point 27 to the thin-walled portion 15b. As a result, the laser output can be easily controlled. Moreover, the thermal strain of the thin-walled portions 15b occurring due to an increase in welding heat input caused by the matching of the welding start point 27 and the welding end point 28 can be suppressed. Further, by setting the matched points of the welding start points 27 and the welding end points 28 at positions located away from the thin-walled portions 15b in the peripheral direction, the strength reduction in the flange 15 and the ring gear 17 can be suppressed.

During torque transmission between the output gear 16 and the ring gear 17, thrust loads in left and right directions act on the ring gear 17, which is a helical gear. The thrust load in the right direction is supported by the flange 15 through a portion subjected to the welding 23, and the thrust load in the left direction is supported by the flange 15 through the stopper wall 22. Accordingly, the load on the portion subjected to the welding 23 can be reduced.

The present invention is not limited to the above-described embodiment, but various design changes can be made without departing from the gist thereof. For example, in the embodiment, the press-fit portion Pf is equally divided into two divided regions, but may be equally divided into three or more divided regions.

What is claimed is:

1. A method of manufacturing a differential device, the differential device comprising a differential mechanism and a differential case housing the differential mechanism,
   the differential case comprising:
   a case body;
   first and second bearing bosses formed integrally with the case body on a first side portion and a second side portion of the differential case, respectively, the first and second bearing axis being aligned on a rotary axis;
   an annular flange, formed integrally with the case body on an intermediate portion thereof, is offset from a center of the differential case and the annular flange is provided on the second side portion of the differential case;
   work windows for inserting the differential mechanism, the work windows being provided in portions of a peripheral wall of the differential case which face each other on a diametral line orthogonal to the rotary axis, the work windows cutting into the flange to form recessed portions in one of opposite side surfaces of the flange facing toward the first side;
   a ring gear press-fitted to an outer peripheral surface of the flange; and
   a press-fit junction between the flange and the ring gear, being welded,
   wherein the method comprises steps of:
   press-fitting a hub of the ring gear to the flange from the first side;
   and equally dividing the press-fit junction between the flange and the ring gear into a plurality of divided regions arranged along a peripheral direction, and simultaneously welding the divided regions.

2. The method of manufacturing a differential device according to claim 1, wherein a stopper wall protruded from an inner peripheral surface of the hub is brought into contact with the flange to regulate a press fit depth of the hub to the flange within a specified range.

3. The method of manufacturing a differential device according to claim 2, wherein the recessed portions are left between the flange and the stopper wall, and gas produced during the welding is discharged through the recessed portions.

\* \* \* \* \*